United States Patent [19]

Bleth et al.

[11] Patent Number: 4,773,444

[45] Date of Patent: Sep. 27, 1988

[54] DUAL DIRECTIONAL RELIEF VALVE

[76] Inventors: Joel J. Bleth, 928 9th East; Williard R. Tormaschy, 819 8th Ave. West, both of Dickinson, N. Dak. 58601

[21] Appl. No.: 934,208

[22] Filed: Nov. 21, 1986

[51] Int. Cl.[4] .............................................. F16K 17/18
[52] U.S. Cl. .................. 137/493; 137/493.9; 137/509
[58] Field of Search ...................... 137/493, 493.9, 509

[56] References Cited

U.S. PATENT DOCUMENTS

| 480,528 | 8/1892 | Thoms ................................ 137/509 |
| 1,138,551 | 5/1915 | Gebhardt . |
| 1,412,357 | 4/1922 | Kramer . |
| 1,428,928 | 9/1922 | Whaley . |
| 1,495,491 | 5/1924 | Le Cain .............................. 137/493 |
| 1,495,491 | 5/1924 | Le Cain . |
| 1,694,492 | 12/1928 | Tabler . |
| 2,710,624 | 6/1955 | Quist ................................. 137/247 |
| 2,928,413 | 3/1960 | Hansen ............................ 137/493.9 |
| 3,099,997 | 8/1963 | Kroffke ............................ 137/509 X |
| 3,164,164 | 1/1965 | Pall et al. ......................... 137/467 |
| 3,566,913 | 3/1971 | Parthe .............................. 137/493 |
| 3,814,123 | 6/1974 | Cook ................................. 137/493.9 |
| 4,439,984 | 4/1984 | Martin .............................. 60/454 |

FOREIGN PATENT DOCUMENTS

| 972638 | 8/1975 | Canada ............................. 137/493 |
| 19085 | 10/1956 | Fed. Rep. of Germany ...... 137/509 |

Primary Examiner—Robert G. Nilson
Attorney, Agent, or Firm—W. Scott Carson

[57] ABSTRACT

A dual directional relief valve including a chamber within which is mounted a piston or valve member. The valve member is biased into a closed position covering and closing the open ends of two conduits. In the preferred embodiment, the conduits are respectively connected to opposite sides of a pump and the open ends of the conduits are concentrically positioned relative to each other. In operation and should dangerously high pressure develop on either side of the pump, the valve member will be opened and the high pressure relieved to pass harmlessly from one conduit to the other through the chamber. The valve member preferably has two surface portions of equal area covering the open ends of the conduits wherein the relief valve can be set to open when a predetermined pressure is exceeded in either conduit.

26 Claims, 4 Drawing Sheets

DUAL DIRECTIONAL RELIEF VALVE

BACKGROUND OF THE INVENTION

1. Field of the Invention

This invention relates to the field of pressure relief valves and more particularly to the field of dual directional relief valves.

2. Background Discussion

Pressure relief valves are widely used in systems handling fluid under pressure to protect the elements of the system including the tanks, lines, and pumps from damage. In most cases, the manufacturers usually recommend and often require that relief valves be used in the systems to maintain the warranty but more importantly, to protect the operators from harm and to avoid potentially dangerous leaks and spills.

The most commonly used and commercially available releif valves are unidirectional meaning that they only work in one direction. Consequently, if fluid is always being pumped for example in one direction from a first tank to a second tank, a unidirectional valve correctly installed in the system will generally protect the elements on the positive side of the pump. However, in a reversible system where fluid is being pumped for example from the first tank to the second tank part of the time and from the second to the first tank at other times, the operator must install two relief valves in the system to truly protect it. Unfortunately, such relief valves are relatively expensive and many operators commonly end up either installing no relief valve at all or taking their chances and installing only one relief valve to protect only one side of their system. Also, and regardless of how many unidirectional relief valves the operator decides to install, such valves always present the inherent problem that they must be installed correctly because if they are installed backwards, they are rendered useless as protective devices. In many situations, it is easy to correctly install such valves to properly protect the system. However, in an equal number of situations, it is not so easy to correctly install them. This is true particularly when the operator is in the field in a hurry with mud and dirt covering the equipment, the operator's manual not readily available, the lighting poor, directional arrows (if any) on the equipment partially or completely obliterated, and the pump lines literally going everywhere.

With these problems in mind, the present invention was developed. With the present invention, a simple and effective valve design is now available for relieving dangerously high pressure in pump systems or any other systems handling fluid under pressure. The valve is dual directional in the sense that it will relieve high pressure regardless of the flow direction through the system. Also, because it is dual directional, it cannot be installed backwards as is the case with many unidirectional relief valves.

SUMMARY OF THE INVENTION

This invention involves a dual directional relief valve. The relief valve includes a chamber within which is mounted a piston or valve member. The valve member is biased into a closed position covering and closing the opern ends of two conduits. In the preferred embodiment, the conduits are respectively connected to opposite sides of a pump and the open ends of the conduits are concentrically positioned relative to each other. In operation and should dangerously high pressure develop on either side of the pump, the valve member will be opened and the high pressure relieved to pass harmlessly from one conduit to the other through the chamber. The valve member preferably has two surface portions of equal area covering the open ends of the conduits wherein the relief valve can be set to open when a predetermined pressure is exceeded in either conduit.

DETAILED DESCRIPTION OF THE PREFERRED EMBODIMENTS

Figure 1:
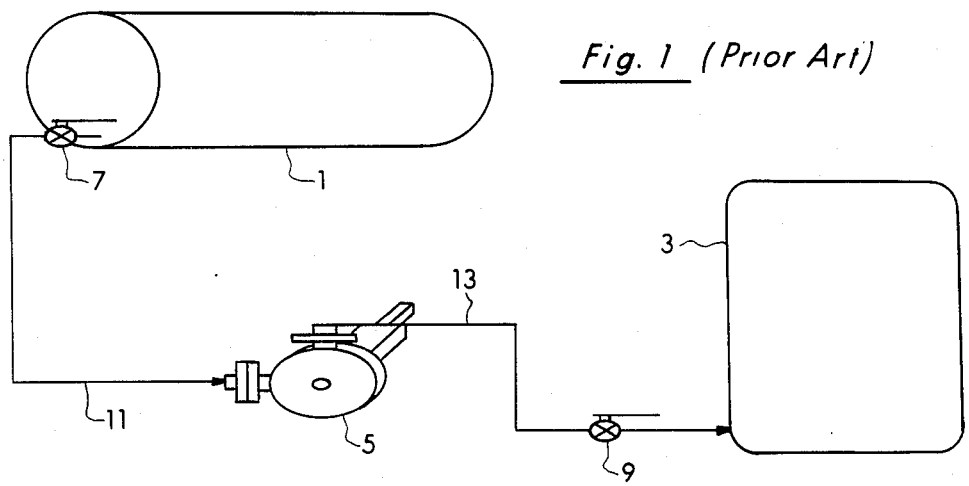
FIG. 1 schematically illustrates a common, prior art pumping arrangement between two tanks.

FIGS. 1-5 illustrate typical pumping arrangements for transferring fluid between two tanks 1 and 3. In such arrangements, the tank 1 is often mounted on a delivery truck with the reversible pump 5 then powered in a conventional manner from a take off connected to the drive train of the truck. The second tank 3 in such arrangements is commonly a stationary storage tank and in operation, the reversible pump 5 can be operated either to fill the stationary tank 3 from the delivery tank 1 as shown in FIG. 1 or conversely, to empty the contents of the storage tank 3 into the truck-mounted tank 1. This operation can be easily and quickly done by simply manipulating the valves 7 and 9 and driving the reversible pump 5 in the proper direction.

In the arrangement of FIG. 1, no relief valve is provided and should a blockage or other flow problem occur in the flow lines 11 and 13, severe damage could easily and quickly occur. For example, should the valve 9 in line 13 in FIG. 1 inadvertently be left closed or should a blockage occur in line 13, the pump 5 could easily develop dangerously high pressures which might rupture or otherwise damage the line 13 and tank 3. This is particularly true if the pump 5 is a positive displacement one such as a gear pump which are commonly used in such arrangements. In a similar manner, if the pump direction in FIG. 1 is reversed as for example when the truck-mounted tank 1 is being filled from the storage tank 3 and should valve 7 be left closed, dangerously high pressures could quickly develop in the line 11 connected to the positive side of the pump 5.

Figure 2:
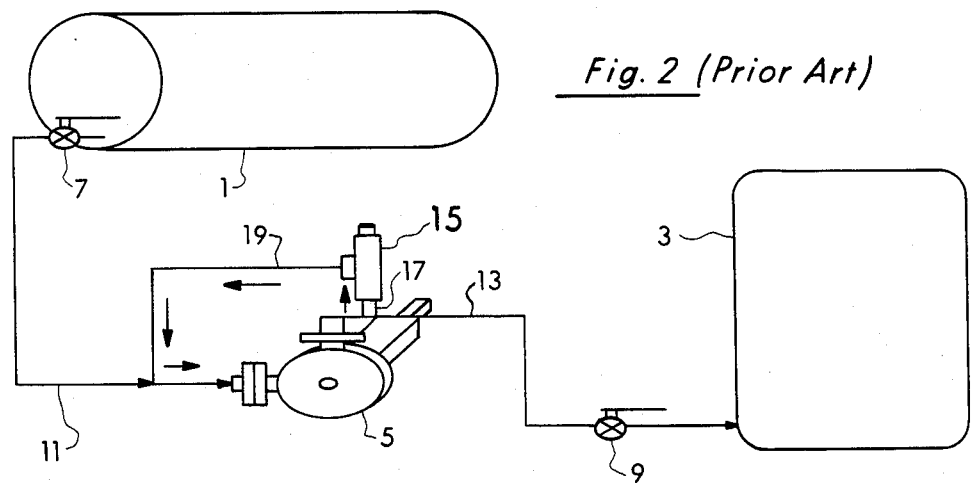
FIG. 2 schematically illustrates the prior art pumping arrangement of FIG. 1 further including a pressure relief valve. In this arrangement, the relief valve is positioned to protected the tank and line on the right side of the pump.
Figure 3:
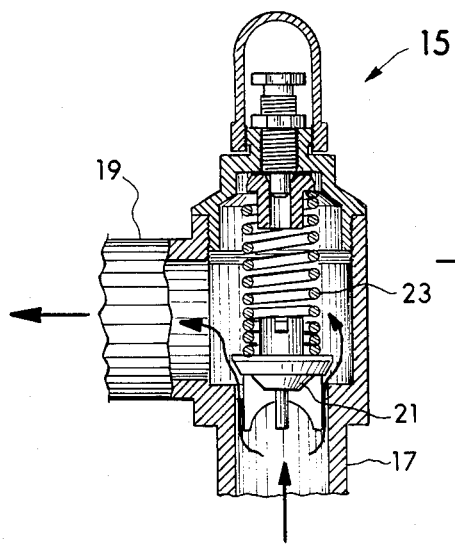
FIG. 3 is an enlarged view of the structure of the prior art relief valve of FIG. 2.

To avoid the potential problems of FIG. 1, it is quite common for manufacturers and users to recommend and even require the use of a relief valve like 15 in FIGS. 2 and 3. In one manner of operation, the relief valve 15 is placed in the line 13 (see FIG. 2) downstream of the pump 5 with a sensing line 17 connected to line 13 and a relief line 19 leading back to line 11 upstream of the pump 5. Then, should valve 9 be left closed or a blockage occur in line 13 and dangerously high pressures develop, this high pressure in line 13 and sensing line 17 (see FIG. 3) will raise or open the valve 21 and allow flow to pass from lines 13 and 17 through the open valve 21 to the relief line 19 and harmlessly back to line 11 upstream of the pump 5. Thereafter, when the valve 9 is opened or the blockage ceases, the spring 23 of the relief valve 15 in FIG. 3 will close the valve 21 and the pump 5 will again assume normal operation transferring fluid from tank 1 to tank 3 in the arrangement of FIG. 2.

Figure 4:
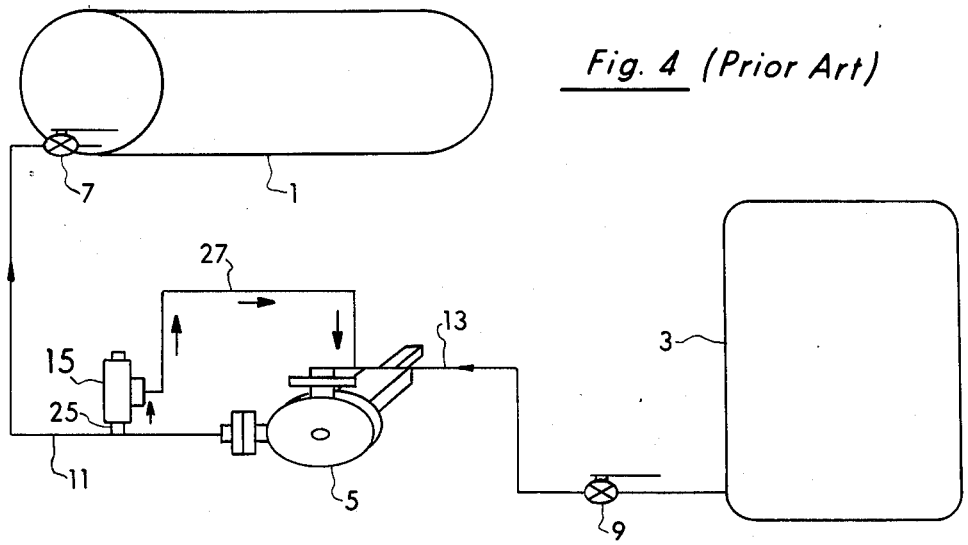
FIG. 4 schematically illustrates the prior art pumping arrangement of FIG. 1 with a relief valve positioned in the system to protect the tank and line on the left side of the reversible pump.
Figure 5:
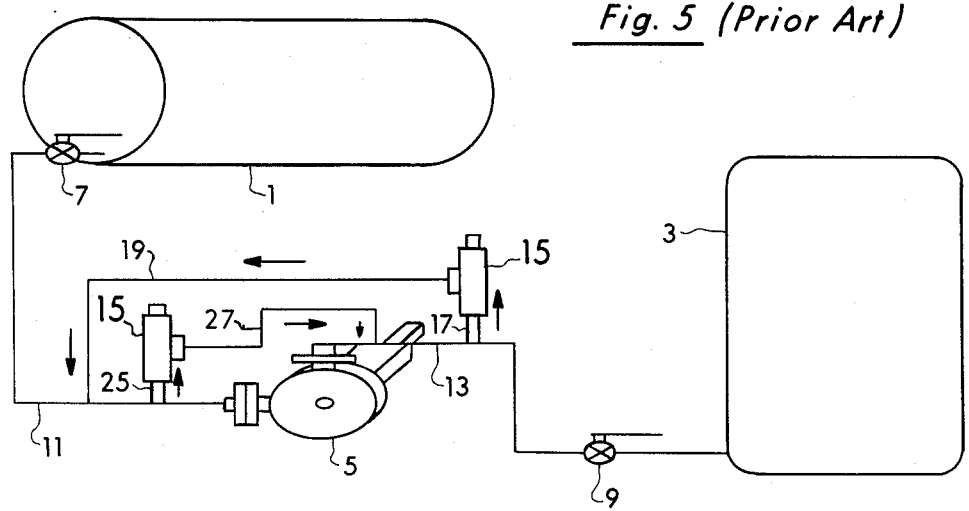
FIG. 5 schematically illustrates the prior art pumping arrangement of FIG. 1 in which two relief valves are used to protect the tanks and lines on both sides of the pump.

In placing the relief valve 15 as shown in the prior art arrangements of FIGS. 2 and 3, the operator has in essence chosen to protect line 13 and tank 3 because when the direction of the pump 5 is reversed to transfer fluid from tank 3 to tank 1, there is no protection. Consequently, with present techniques, the operator is faced with the choices of no protection (FIG. 1), protecting line 13 and tank 3 (FIG. 2), protecting line 11 and tank 1 by mounting a relief valve 15 with sensing line 25 and relief line 27 as shown in FIG. 4, or installing two relief valves 15 as shown in FIG. 5. The prior art arrangement of FIG. 5 is really the only choice an operator presently has to truly protect his system. Unfortunately, relief valve such as 15 are very expensive so that most operators usually end up taking their chances and only protecting one side of their system (i.e., using only a single relief valve 15 in either the arrangement of FIG. 2 or FIG. 4).

Figure 6:
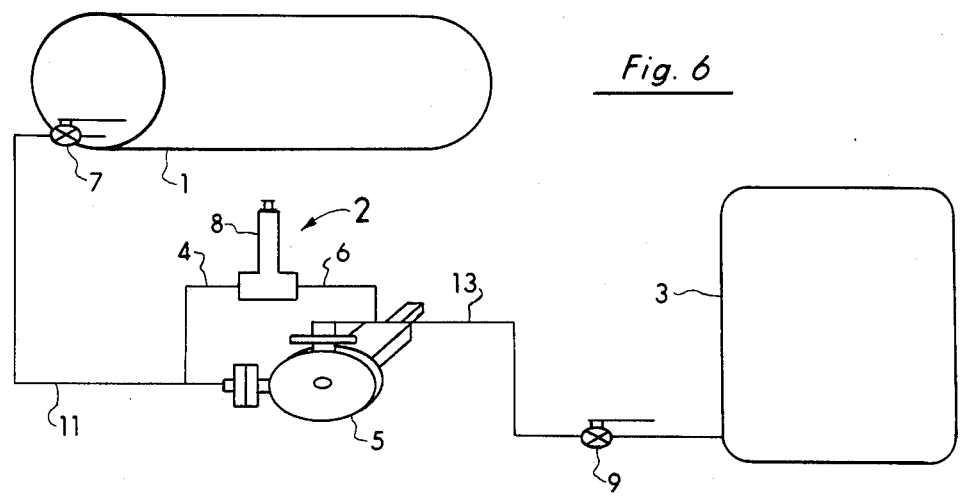
FIG. 6 schematically illustrates the use of the single, dual directional relief valve of the present invention to protect the tanks and lines on both sides of the pump.

In contrast to the prior art approaches of FIGS. 1-5, the dual directional relief valve 2 of the present invention will protect the basic elements of the pumping system 1, 3, 11, and 13 regardless of which way the reversible pump 5 is operated. Further, and in comparison to the prior art arrangement of FIG. 5, the present invention will do so using only a single relief valve 2. More specifically and referring to FIG. 6, the dual directional relief valve 2 of the present invention can be mounted in the basic pump system by simply running lines 4 and 6 from the valve 2 to the lines 11 and 13 on either side of the pump 5. As discussed in more detail below, the valve 2 is operationally symmetrical. Consequently, it does not matter whether lines 4 and 6 are connected to lines 11 and 13 as shown in FIG. 6 or are reversed and connected to lines 13 and 11 respectively. This is in direct contrast to the unidirectional relief valves 15 of the prior art which only work in one direction and if they are put in or connected backwards (e.g., sensing line 17 connected to line 11 in FIG. 2 and relief line 19 connected to line 13), they are rendered useless as protective devices. Proper hookup of the unidirectional relief valves 15 of the prior art seems a simple task but often it is not. This is true even for experienced operators particularly when they find themselves in a hurry in the field with mud and dirt covering the equipment and with perhaps less than ideal lighting. In such cases, the mud, dirt, and/or poor lighting may partially or completely obliterate the directional arrows (if there are any) on the valve 15 and puump 5. Also, in the field, the lines 11 and 13 of the pump 5 often are not as accessible and as easily identified as might be suggested by the schematic drawings of FIGS. 1-5.

Figure 7:
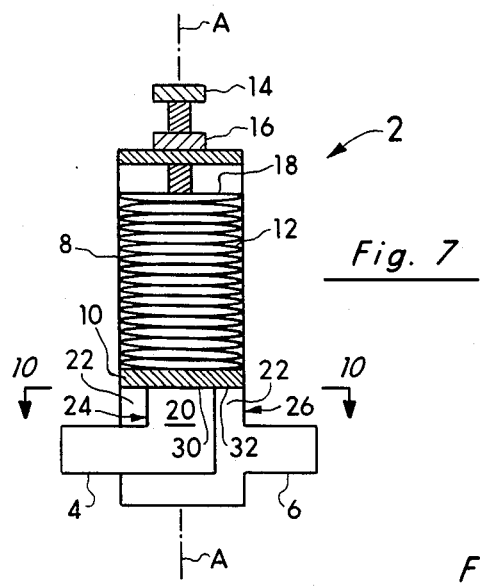
FIG. 7 is a cross-sectional view of the dual directional relief valve of the present invention in its closed position.
Figure 8:
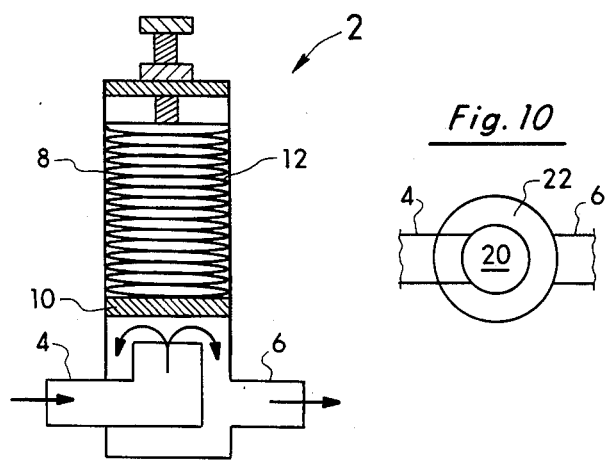
FIG. 8 illustrates the operation of the relief valve of the present invention in its open position to relieve high pressure from conduit 4 to conduit 6.
Figure 10:
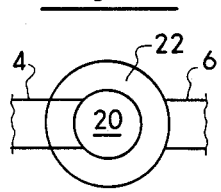
FIG. 10 is a view along line 10—10 of FIG. 7 illustrating the concentric arrangement of the open ends of the conduits 4 and 6.

Referring again to the dual directional relief valve 2 of the present invention as illustrated in FIGS. 6-10, the valve 2 includes a chamber or housing 8 within which is mounted a piston or valve member 10 (see FIG. 7). The valve member 10 is biased in the closed position of FIG. 7 by coil spring 12 or other biasing means with the tension or biasing force on the valve member 10 being adjustable by manipulation of the simple arrangement of bolt 14, locknut 16, and spring guide 18. In the closed position of FIG. 7, the disc-shaped valve member 10 covers and closes the open ends 20 and 22 of the first and second lines or conduits 4 and 6. More specifically, the conduit 4 has an end portion 24 defining the open end 20 adjacent the valve member 10. Similarly, the conduit 6 has an end portion 26 defining the open end 22. The open ends 20 and 22 (see FIG. 10) are concentrically positioned relative to each other and in the preferred embodiment, their surface areas are equal wherein the outer radius of the annular open end 22 is twice the radius of the circular open end 20.

Figure 9:
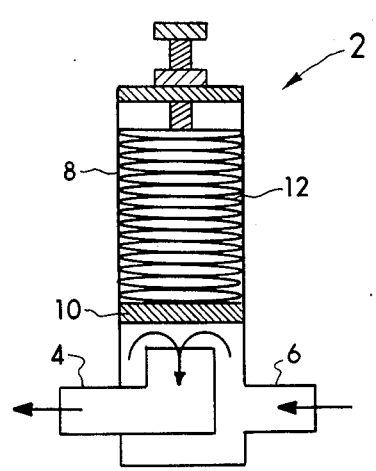
FIG. 9 shows the relief valve of the present invention in operation to relieve high pressure in the opposite direction of FIG. 8 from conduit 6 to conduit 4.

In operation of the embodiment of FIGS. 6-10, the tensioning or biasing arrangement of coil spring 12, bolt 14, locknut 16, and spring guide 18 is first adjusted to maintain valve member 10 closed under the desired force. This is done by manipulation of the bolt 14 and locknut 16 to provide a predetermined biasing force along the axis A—A to the valve member 10 along the axis A—A. As shown in FIG. 7, the lower surface of the valve member 10 has first and second surface portions 30 and 32 covering and closing the open ends 20 and 22. The surface portions 30 and 32 are rigid and fixed relative to each other and spaced from each other in a manner corresponding to the spacing of the open ends 20 and 22. In the embodiment of FIGS. 6-10 and like the spaced-apart open ends 20 and 22 of the conduits 4 and 6, the surface portions 30 and 32 have equal surface areas. That is, the outer radius of the annular surface portion 32 is twice the radius of the circular surface portion 30 in the manner of the open ends 20 and 22 in FIG. 10. Consequently and with the closing force of the valve member 10 set as desired, the dual directional releif valve 2 of the present invention will open whenever the pressure in line 4 or 6 exceeds a predetermined value. In doing so, the line pressure will exert a force upwardly against the valve member 10 which is then greater than the biasing force exerted downwardly by the spring 12. For example and referring to FIG. 8, if the pump 5 in FIG. 6 is pumping from right to left to deliver fluid from the stationary tank 3 to the truck-mounted tank 1 and a blockage develops in line 11, the pressure in conduit 4 connected to line 11 will increase. Thereafter and once the line pressure exceeds a predetermined value wherein the force (i.e., pressure times the area of the surface portions 30) is greater than the biasing force of spring 12, the valve member 10 will open. This will then vent the high pressure fluid in conduit 4 harmlessly through the lower portion of the chamber 8 to the conduit 6. Conversely and as shown in FIG. 9, should the pressure in the conduit 6 increase and exceed a predetermined value, the lifting force on the valve member 10 (i.e., pressure in the conduit 6 times the area of the surface portion 32) will be greater than the biasing force of spring 12. The valve member 10 will then open to vent the high pressure fluid in the conduit 6 harmlessly through the lower portion of the valve 8 to the conduit 4. In this manner and using only the single, unitary valve member 10, the pumping arrangement of FIG. 6 can be protected regardless of which way the reversible pump 5 is operating.

Figure 14:
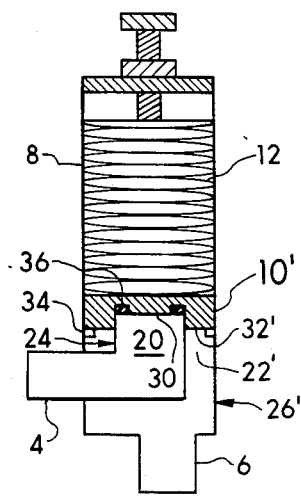
FIG. 14 illustrates the preferred embodiment of the present invention using a modified, disc-shaped valve member.

In the embodiment of FIGS. 6–10, the piston or valve member 10 preferably has planar surface portions 30 and 32 covering and closing the open ends 20 and 22 of the conduits 4 and 6. As shown, these first and second surface portions 30 and 32 are co-planar as are the open ends 20 and 22 of the conduits 4 and 6. The chamber 8 and end portions 24 and 26 of the conduits 4 and 6 meet at the surface portions 30 and 32 when the valve member 10 is in the closed position of FIG. 7. In the preferred embodiment of FIG. 14, the circular surface portion 30 and annular surface portion 32' of the valve member 10' are also of equal surface area. Additionally, they are planar and parallel but they are not co-planar with each other as in the embodiment of FIGS. 6–10. In the embodiment of FIG. 14, the chamber 8 like the chamber 8 in FIGS. 6–10 provides fluid communication between the right angle conduits 4 and 6 with the valve member 10' selectively preventing and allowing such flow depending upon whether it is in its closed or opened position. The open end 22' of the conduit 6 essentially merges with the chamber 8 with the distinction between them being defined when the valve member 10' is in its closed position of FIG. 14. In this position, the valve member 10' rests on the valve seat 34 and an O-ring 36 is provided to enhance the seal between the surface portion 30 and the open end 20 of the conduit 4. Otherwise, the operation of the embodiments of FIGS. 6–10 and 14 is the same.

Figure 11:
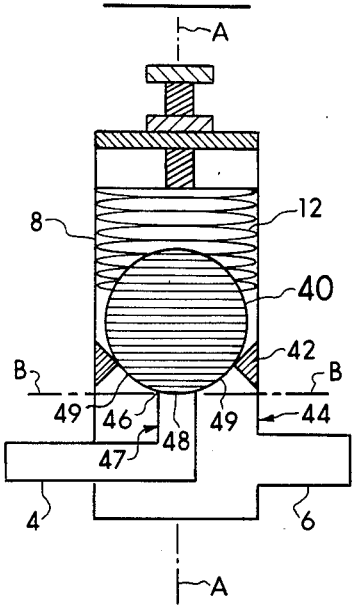
FIG. 11 is a cross-sectional view of the present invention adapted for use with a ball valve.
Figure 12:
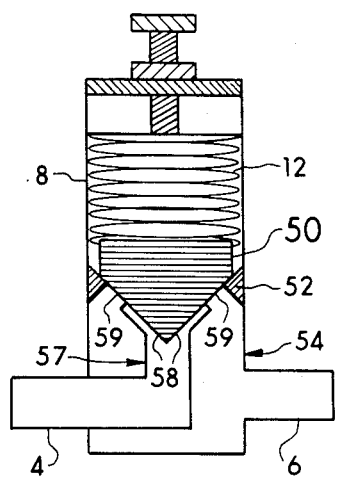
FIG. 12 illustrates a modification of the present invention adapted for use with a cone valve.
Figure 13:
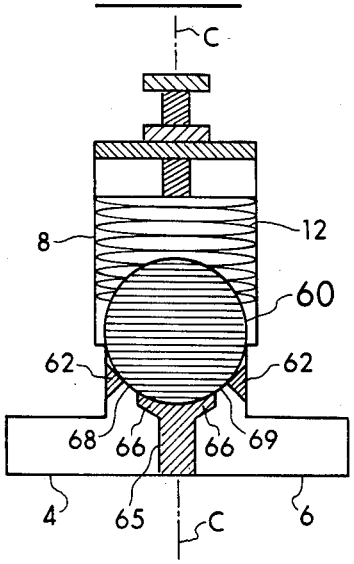
FIG. 13 illustrates another embodiment of the present invention adapted for use with a ball valve.

FIGS. 11–13 illustrate adaptations of the basic invention to ball valves (FIGS. 11 and 13) and cone valves (FIG. 12). In the embodiment of FIG. 11, the spherical or ball valve 40 abuts and seats against the valve seat 42 at the open end of the end portion 44 of the conduit 6. The ball valve 40 also abuts and seats against the valve seat 46 at the open end of the end portion 47 of the conduit 4. As in the embodiment of FIGS. 6–10, the operating area of the first and second surface portions 48 and 49 of the ball valve 40 are preferably the same. That is, the projected areas of surfaces 48 and 49 onto a horizontal plane B in FIG. 11 are the same. Consequently, whenever the pressure in either line 4 or 6 exceeds a predetermined value, it will apply an upward force (i.e., pressure times the projected surface area of 48 or 49) that is opposite to and greater than the downward biasing force being applied along the vertical axis A—A by the spring 12. This, in turn, will raise or open the valve member 40 and relieve the pressure. Similarly, in FIG. 12, the cone valve 50 seats on the valve seat 52 at the open end of the end portion 54 of the conduit 6 and the valve seat at the open end of the end portion 57 of the conduit 4. Additionally, the projected areas of the first and second surface portions 58 and 59 are equal. However, in comparison to the embodiment of FIG. 11 in which the first and second surface portions 48 and 49 are curved about a common center and have the same radius of curvature, the corresponding surface portions 58 and 59 in FIG. 12 are respectively conical and frustoconical. Otherwise, the operation is essentially the same.

The embodiment of FIG. 13 is slightly different from the other embodiments in that all of its operating features are symmetrical about the central plane C. That is, the other embodiments (see for example FIGS. 6–10) essentially have the open ends 20 and 22 of the conduits 4 and 6 and the first and second surfaces 30 and 32 concentrically arranged (see FIGS. 7 and 10) about the central axis A—A. In contrast, the corresponding features of the embodiment of FIG. 13 are mirror images of each other on either side (i.e., left and right) of the central plane C. In this light, the ball valve 60 in FIG. 13 seats on mirror image portions of the valve seats 62 and 66 with the base 65 of the valve seat 66 preventing flow directly between conduits 4 and 6. In operation as in the other embodiments, the valve 60 in FIG. 13 will be opened to relieve pressure and allow flow between the mirror-image open ends 68 and 69 through chamber 8 whenever the pressure in conduit 4 or 6 exceeds a predetermined value.

Although several embodiments have been shown and described in detail, it is understood that various modifications and changes can be made to them without departing from the scope of the invention.

We claim:
1. A dual directional relief valve including:
   a first conduit having an end portion defining an open end,
   a second conduit having an end portion defining an open end spaced from the open end of said first conduit, and
   valve means for selectively preventing and allowing flow between said first and second conduits through said spaced-apart open ends in response to fluid pressure in either of said first and second conduits exceeding a predetermined amount wherein said valve means will open to relieve pressure and allow flow from said first conduit to said conduit through said open ends when the fluid pressure in said first conduit exceeds said predetermined amount and said valve means will open to relieve pressure and allow flow from said second conduit to said first conduit through said open ends when the fluid pressure in said second conduit exceeds said predetermined amount, said valve means including:
   a chamber providing fluid communication between said first and second conduits through the open ends thereof,
   a single, unitary valve member having a surface with first and second surface portions, said first and second surface portions each being rigid and fixed relative to each other and spaced from each other in a manner substantially corresponding to the spacing of said spaced-apart open ends of said first and second conduits, means for mounting said single, unitary valve member in said chamber for movement between closed and opened positions, said first and second surface portions of said valve member respectively covering and closing the respective open ends of said first and second conduits in said closed position to prevent fluid flow between said first and second conduits through said open ends and said first and second surface portions being spaced from the respective open ends of said first and second conduits in said opened position, and means for biasing said single, unitary valve member in said closed position, said biasing means providing a predetermined biasing force in a first direction and said first and second surface portions having substantially the same projected area onto a plane substantially perpendicular to said first direction of said biasing force whereby said valve member will be moved to said opened position against said biasing force when the fluid pressure in either of the first and second conduits exerts a force on either of said first and second surface portions greater than said biasing force and in a direction opposite to said first direction of said biasing force.

2. The relief valve of claim 1 wherein said first and second surface portions are substantially planar.

3. The relief valve of claim 2 wherein the planes of said first and second surface portions are substantially co-planar.

4. The relief valve of claim 2 wherein the planes of said first and second surface portions are substantially parallel.

5. The relief valve of claim 4 wherein the planes of said first and second surface portions are substantially co-planar.

6. The relief valve of claim 1 wherein said first and second surface portions are substantially concentric.

7. The relief valve of claim 6 wherein said first and second surface portions are substantially planar.

8. The relief valve of claim 7 wherein said first and second surface portions are substantially parallel.

9. The relief valve of claim 8 wherein said first and second surface portions are substantially co-planar.

10. The relief valve of claim 6 wherein one of said surface portions is substantially annular.

11. The relief valve of claim 6 wherein said first and second surface portions are curved.

12. The relief valve of claim 11 wherein said first and second surface portions have a common radius of curvation.

13. The relief valve of claim 6 wherein said first surface portion is substanitally conical and said second surface portion is substantially frusto-conical.

14. The relief valve of claim 1 wherein said first and second surface portions are curved.

15. The relief valve of claim 14 wherein said first and second surface portions have a common radius of curvation.

16. The relief valve of claim 1 wherein said first surface portion is substantially conical and said second surface portion is substantially frusto-conical.

17. The relief valve of claim 1 wherein said valve member is substantially disc-shaped.

18. The relief valve of claim 1 wherein said valve member is substantially spherical.

19. The relief valve of claim 1 wherein said valve member is substantially cone-shaped.

20. The relief valve of claim 1 wherein said first and second surface portions are substantially mirror images of one another.

21. The relief valve of claim 20 wherein said first and second surface portions are curved.

22. The relief valve of claim 1 wherein said valve member in said closed position prevents flow between said chamber and said first and second conduits.

23. The relief valve of claim 1 wherein said end portion of said first conduit includes a first valve seat and the end portion of said second conduit includes a second valve seat and said mounting means mounts said valve member wherein said first and second surface portions respectively abut said first and second valve seats when said single, unitary valve member is in said closed position.

24. The relief valve of claim 1 wherein one of said first and second surface portions is circular and the other of said first and second surface portions is annular.

25. The relief valve of claim 24 wherein said first and second surface portions are concentric.

26. The relief valve of claim 24 wherein said first and second portions are co-planar

* * * * *